May 8, 1951   J. DITTO   2,551,877
FOOD TURNER
Filed Aug. 26, 1949
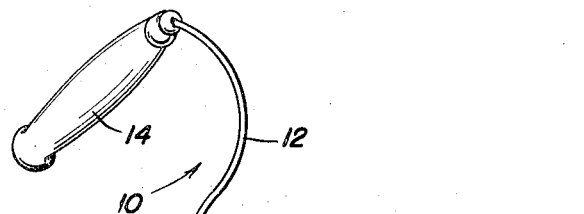
Fig. 1.
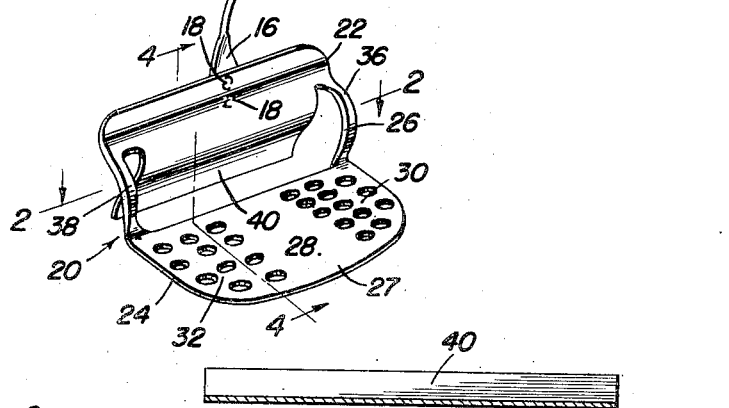
Fig. 2.
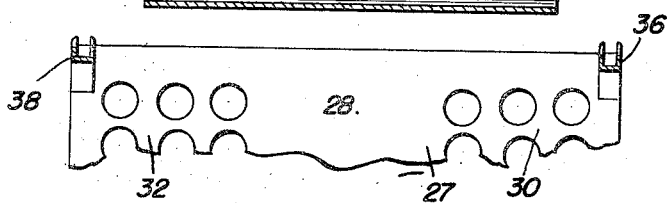
Fig. 3.   Fig. 4.
John Ditto
INVENTOR.
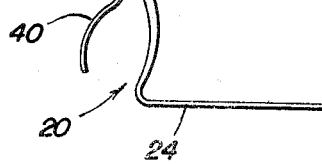
BY
Attorneys Patented May 8, 1951

2,551,877

UNITED STATES PATENT OFFICE 2,551,877

FOOD TURNER

John Ditto, Herrin, Ill., assignor of fifty per cent to Charles D. Winters and Kenneth B. Powless, Marion, and Lon Haney, Herrin, Ill.

Application August 26, 1949, Serial No. 112,622

6 Claims. (Cl. 294—7)

This invention relates to novel and useful improvements in cooking utensils.

An object of this invention is to turn eggs, hamburgers, and other articles of foodstuff by means of a cooking utensil having a substantially flat blade and a back wall secured thereto, the back wall having an opening therein constituting a food article passage and a curved baffle in the opening whereby upon tilting the blade so that the front edge thereof is raised above the rear edge, the article of foodstuff slides rearwardly toward and through the opening, the baffle guiding the article of foodstuff so that it is reversed or turned as the device is moved backward slightly or lifted.

Another object of this invention is to minimize splashing of cooking oils and greases in that the above operation allows the article of foodstuff to be deposited on the grill, frying pan or the like without forcibly striking the grill or frying pan.

Another object of this invention is to so arrange the blade that cooking oils and greases may be pressed from certain articles of foodstuff, as hamburgers, drain openings being provided for this purpose.

Another object of this invention is to conveniently support the device by means of a smoothly curved hook carried by the rear part of the blade cooperating with the smooth curvature of the rear part of the blade, the hook and the smoothly curved rear part of the blade cooperating to form a pocket to support the device.

Ancillary objects and features of novelty will become apparent in following the description of the preferred form of the invention, illustrated in the accompanying drawings, wherein:

Figure 1 is a perspective view of the device;

Figure 2 is a sectional view taken on the line 2—2 of Figure 1 in the direction of the arrows;

Figure 3 is an elevational view of the device shown in Figure 1, and

Figure 4 is a sectional view taken substantially on the line 4—4 of Figure 1 in the direction of the arrows.

A handle generally indicated at 10 consists of a shank 12 and a hand receiving member 14. The hand receiving member 14 is preferably made of a material such as wood having a low heat conductivity value. The shank 12 is smoothly curved from the end which joins with the handle to a point spaced from the opposite end. The said opposite end is flat as at 16 so as to receive a pair of rivets 18.

A blade generally indicated at 20 is fixed to the flat portion 16 of the shank 12. The blade consists of two main parts, the rear part or wall 22 and the front part or blade 24, which is substantially flat. The rear part 22 has an opening 26 therein which terminates at its lower part at the rear edge of the front part 24 and which constitutes a food article passage. The center section 28 of the blade behind the front edge region 27 is solid to act in the capacity of a foodstuff presser, while the two flanking sections 30 and 32 have a number of apertures therein for cooking oil or grease drainage.

The rear wall 22 of the blade is smoothly curved from the upper longitudinal edge thereof to the lower edge thereof. The material of the rear part 22 at each side of the opening 26 is substantially channel-shaped as indicated at 36 and 38. This adds strength to the structure. A baffle 40 is disposed in the opening 26. This baffle is smoothly curved in cross-section as disclosed in Figures 3 and 4 with the lower end thereof projecting toward the flat blade of the device. A minor use of the baffle is to act in the nature of a hook so that the device may be supported on the edge of a pot or other utensil. The main purpose of the baffle is to guide the article of foodstuff as it is being turned.

In operation, when the article is disposed on the blade or front part of the device, the handle is lowered by the operator a sufficient amount to lift the front of the blade to that point where the food will slide to the back. As the food slides rearwardly, one edge thereof abuts the baffle. Upon coming in contact with the baffle, flexible articles such as fried eggs will follow the curved baffle and turn downwardly through the opening 26, thereafter sliding forward from the operator of the device upon the cooking surface by merely lifting the food turner off the cooking surface. Then, the article, a fried egg in this instance, is under the blade or flat front portion of the device.

By this process the article of food while cooking is turned over by tilting the handle backwardly about an axis transverse to the conventional axis of rotation of an ordinary spatula. In this operation, the splashing of fats upon walls and stoves is eliminated and the breaking of egg yolks is minimized.

In depositing a hamburger, egg, or the like on a plate or slice of bread, the same process takes place with the exception that it is performed above the slice of bread or plate instead of being performed over the cooking surface.

The device has been described mainly for use in connection with fried eggs. However, it is apparent that other articles of foodstuff may be the subject of operation on which the invention is employed.

Having described the invention, what is claimed as new is:

1. A cooking utensil comprising a handle provided with a blade at one end, said blade having a wall rising from one edge portion thereof, said wall having an opening therein constituting a food article passage, and means comprising a baffle disposed in said passage for guiding the food article as it passes through said passage in response to tilting the blade.

2. The combination of claim 1 and said guiding means comprising a baffle connected at its upper end to said wall and spaced at its lower end from said blade.

3. A cooking utensil comprising a handle with a blade connected thereto at one end of the handle, said blade having a plurality of grease draining opening therein, a solid food pressing portion, and a baffle spaced slightly from one edge thereof for guiding the food article as it is slid from the table.

4. A cooking utensil comprising a handle, a blade with a wall at the rear of said blade, said wall being secured to said handle, and said wall having an opening therein, a baffle forming a part of said wall and disposed in said opening to guide an article of foodstuff and direct it forwardly as the blade is tilted upwardly and displaced, when the angle of tilt is such as to cause the article of foodstuff to slide rearwardly on the blade.

5. In a cooking utensil, a handle, a food handling portion comprising a blade and a rear portion fixed thereto, said rear portion having an opening therein with a curved baffle disposed in said opening, the curvature of said baffle being such that the lower end of the baffle is directed forwardly a slight amount so that when the blade is tilted in such a manner that the article of foodstuff will slide rearwardly, it contacts and is guided by the baffle forwardly at a slight angle thereby turning the article of foodstuff.

6. In a cooking utensil which includes a handle, an article of foodstuff handling portion comprising a blade having a rear portion disposed at an angle with respect to the plane of the blade, said rear portion having an opening therein at the junction of the rear portion of the blade, and means carried by said rear portion and at least in part disposed in said opening for guiding an article of foodstuff that has been slid rearwardly on the blade as it is passed through said opening.

JOHN DITTO.

REFERENCES CITED

The following references are of record in the file of this patent:

UNITED STATES PATENTS

| Number | Name | Date |
|---|---|---|
| 1,592,698 | Hudson | July 13, 1926 |